(12) United States Patent
Liu et al.

(10) Patent No.: US 11,451,159 B2
(45) Date of Patent: Sep. 20, 2022

(54) THREE-PHASE SYSTEM AND DISTRIBUTED CONTROL METHOD THEREOF

(71) Applicant: Delta Electronics (Shanghai) Co., Ltd., Shanghai (CN)

(72) Inventors: Hong Liu, Shanghai (CN); Tao Xia, Shanghai (CN); Yong Tao, Shanghai (CN); Cheng Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/228,737

(22) Filed: Apr. 13, 2021

(65) Prior Publication Data

US 2021/0391806 A1 Dec. 16, 2021

(30) Foreign Application Priority Data

Jun. 10, 2020 (CN) .......................... 202010523733.9

(51) Int. Cl.
*H02M 7/217* (2006.01)
*H02M 7/23* (2006.01)
(Continued)

(52) U.S. Cl.
CPC ........... *H02M 7/2173* (2013.01); *H02M 7/23* (2013.01); *H02M 1/0003* (2021.05); *H02M 7/219* (2013.01)

(58) Field of Classification Search
CPC ...... H02M 7/2173; H02M 7/219; H02M 7/23; H02M 1/0003
See application file for complete search history.

(56) References Cited

U.S. PATENT DOCUMENTS

2007/0179720 A1 8/2007 Becker et al.
2009/0154203 A1 6/2009 Kravitz
(Continued)

FOREIGN PATENT DOCUMENTS

| CN | 102804580 A | 11/2012 |
|---|---|---|
| CN | 103094916 A | 5/2013 |
| CN | 103219908 A | 7/2013 |

OTHER PUBLICATIONS

Hossein Dehghani Tafti et al., "Flexible Control of Photovoltaic Grid-Connected Cascaded H-Bridge Converters During Unbalanced Voltage Sags", IEEE Transactions on Industrial Electronics, IEEE Service Center, Piscataway, NJ, USA, vol. 65, No. 8, Aug. 1, 2018.

*Primary Examiner* — Jue Zhang
(74) *Attorney, Agent, or Firm* — CKC & Partners Co., LLC

(57) ABSTRACT

Disclosed are three-phase system and distributed control method. The three-phase system comprises three-phase circuits, of which each phase circuit including at least one power conversion cell; and at least three phase controllers for controlling each phase circuit, respectively, each phase controller including a communication interface through which the at least three phase controllers are in communications connection with each other; wherein the phase controllers of each phase circuit is configured for regulating bridge arm voltages of the at least one power conversion cell in the phase circuit by receiving signals sent from the phase controllers of other two phase circuits through the communication interface. The three-phase system and the distributed control method of the invention solve problems of balance of three-phase current and stabilization of three-phase DC voltages by coordination among the three phases. Thanks to the invention, the three phases can be independently controlled to improve control flexibility.

18 Claims, 11 Drawing Sheets

(51) Int. Cl.
  *H02M 1/00* (2006.01)
  *H02M 7/219* (2006.01)

(56) References Cited

U.S. PATENT DOCUMENTS

| | | |
|---|---|---|
| 2009/0267572 A1 | 10/2009 | Engelhardt et al. |
| 2013/0051105 A1 | 2/2013 | Wang et al. |
| 2016/0349818 A1 | 12/2016 | Sonnaillon |
| 2017/0133949 A1 | 5/2017 | Pieschel et al. |
| 2018/0212430 A1* | 7/2018 | Chung .................. H02J 3/1807 |
| 2019/0190276 A1 | 6/2019 | Liu et al. |
| 2019/0257211 A1 | 8/2019 | Huang et al. |
| 2019/0305688 A1 | 10/2019 | Seymour |
| 2021/0288591 A1 | 9/2021 | Kuhn et al. |

\* cited by examiner

THREE-PHASE SYSTEM AND DISTRIBUTED CONTROL METHOD THEREOF

CROSS-REFERENCE TO RELATED APPLICATIONS

This non-provisional application claims priority under 35 U.S.C. § 119(a) on Patent Application No. 202010523733.9 filed in P.R. China on Jun. 10, 2020, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The invention relates to the technical field of power electronics, and particularly to a three-phase system and a distributed control method thereof.

BACKGROUND

Three-phase combined type converter refers to a three-phase converter formed of a combination of three single-phase systems. Three-phase Cascade H-Bridge (CHB) is a typical three-phase combined type converter, and is a structure widely applied in medium and high voltage power inverters. The CHB topology may be applied to products, such as, Static Var Generator (SVG), Solid State Transformer (SST), and medium and high voltage storage inverters.

The three-phase CHB has two connections, i.e., Y-connection and delta-connection. The key problem of controlling the three-phase combined type converter is how to ensure stabilization of three-phase DC voltages (i.e., DC-link voltages), and balance of three-phase power grid currents when loads at three-phase DC sides are unbalanced. Currently, a centralized control manner is generally utilized, i.e., feeding back and controlling a three-phase average DC voltage through a centralized controller, and a voltage balance control is added such that a DC voltage of each phase approaches the three-phase average voltage. Generally, a zero-sequence injection method is used to balance the three-phase DC voltages. As for a delta-connection system, a zero-sequence current injection method is used, and as for a Y-connection system, a zero-sequence voltage injection method is used.

However, the current centralized control manner has a low reliablity, and once the centralized controller has failure, or one phase circuit has failure, the entire three-phase system stops working, and cannot be stably operated.

SUMMARY

An object of the invention is to provide a three-phase system and a distributed control method thereof, which can solve one or more deficiencies in the prior art.

To realize the above object, the invention provides a three-phase system, comprising: three-phase circuit, each phase circuit of the three-phase circuit including at least one power conversion cell; and at least three phase controllers for controlling each phase circuit, respectively, each of the phase controllers including a communication interface through which the at least three phase controllers are in communications connection with each other; wherein the phase controller of each phase circuit is configured for regulating bridge arm voltage of the at least one power conversion cell in the corresponding phase circuit by receiving signals sent from the phase controllers of other two phase circuits through the communication interface.

To realize the above object, the invention further provides a three-phase system, comprising: three-phase circuit, each phase circuit of the three-phase circuit including at least one power conversion cell; and at least three phase controllers for controlling each phase circuit, respectively, wherein each of the phase controllers generates active power signal (XA, XB and XC) reflecting active power of the corresponding phase circuit according to voltage signal reflecting the corresponding phase circuit, respectively; each of the phase controllers also receives active power signals reflecting active powers of other two phase circuits, and generate zero-sequence component according to the active power signals (XA, XB and XC) reflecting active power of each phase circuit and phase signals (YA, YB and YC) reflecting current phase or voltage phase of each phase circuits, wherein, the zero-sequence component=$(XA \times YA + XB \times YB + XC \times YC) \times K0$, where $K0$ is a proportional coefficient; each of the phase controllers further regulates bridge arm voltage of each power conversion cell in the corresponding phase circuit according to the zero-sequence component correspondingly.

To realize the above object, the invention further provides distributed control method of a three-phase system, wherein the three-phase system comprises: three-phase circuits, each phase circuit of the three-phase circuit including at least one power conversion cell; and at least three phase controllers for controlling each phase circuit, respectively, each of the phase controllers including a communication interface through which the at least three phase controllers are in communications connection with each other; wherein the distributed control method comprises:

when loads at DC sides of the three-phase system are unbalanced, generating, by each of the phase controllers, active power signal (XA, XB, XC) reflecting active power of the corresponding phase circuit according to voltage signal of the corresponding phase circuit, respectively;

receiving, by each of the phase controllers, active power signals reflecting active powers of other two phase circuits, and generating zero-sequence components according to the active power signals (XA, XB and XC) reflecting active powers of each phase circuits and phase signals (YA, YB and YC) reflecting current phases or voltage phases of each phase circuits, wherein, the zero-sequence components=$(XA \times YA + XB \times YB + XC \times YC) \times K0$, where $K0$ is a proportional coefficient;

regulating, by each of the phase controllers, bridge arm voltages of the respective power conversion cells in the corresponding phase circuit according to the zero-sequence components correspondingly.

The three-phase system and the distributed control method thereof in the invention solve problems of balance of three-phase current and stabilization of three-phase DC voltages through coordination among the three phases. As compared to the centralized control manner, single point failure risk of the controller is reduced, and the three phases can be independently and individually controlled to improve control flexibility.

The additional aspects and advantages of the invention are partially explained in the below description, and partially becoming apparent from the description, or can be obtained through practice of the invention.

BRIEF DESCRIPTION OF THE DRAWINGS

The exemplary embodiments will be described in detail with reference to the accompanying drawings, through which the above and other features and advantages of the disclosure will become more apparent.

DETAILED DESCRIPTION

Figure 1:
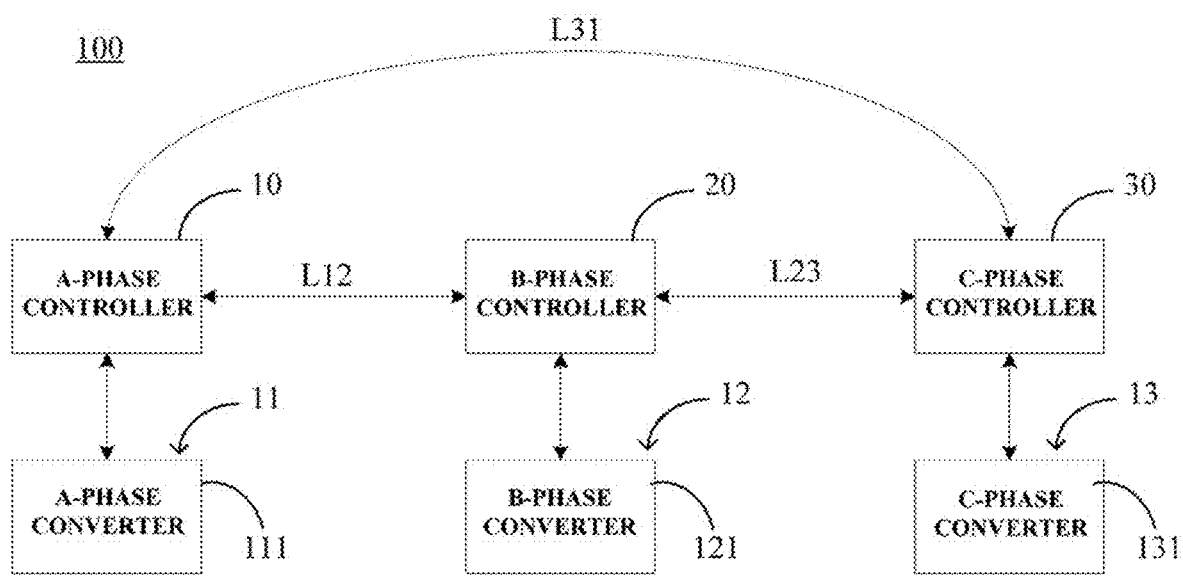
FIG. 1 is a structural diagram of a three-phase system according to a preferable embodiment of the invention.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over other component. It shall be understood that if the signed device reverses to turn upside down, the described component on an "upper" side will become a component on a "lower" side. In addition, the terms "first", "second" and the like in the claims are only used as signs, instead of numeral limitations to objects.

As shown in FIG. 1, a three-phase system 100 in a preferable embodiment of the invention comprises three-phase circuits, for example, an A-phase circuit 11, a B-phase circuit 12 and a C-phase circuit 13, wherein each phase circuit may comprise at least one power conversion cell. In the embodiment of FIG. 1, taking each phase circuit including one power conversion cell as an example, that is, the A-phase circuit 11 has one A-phase converter 111, the B-phase circuit 12 has one B-phase converter 121, and the C-phase circuit 13 has one C-phase converter 131. However, it shall be understood that in other embodiments, each phase circuit also can include a plurality of power conversion cells, but the invention is not limited thereto.

The three-phase system 100 of the invention further comprises at least three phase controllers for correspondingly controlling each phase circuit, respectively. For example, the A-phase circuit 11, the B-phase circuit 12 and the C-phase circuit 13 are correspondingly controlled by an A-phase controller 10, a B-phase controller 20 and a C-phase controller 30, respectively. In the invention, each of the phase controllers 10, 20 and 30 includes a communication interface through which these phase controllers 10, 20 and 30 are in communications connection with each other. For example, the A-phase controller 10 and the B-phase controller 20 may perform communication and coordination therebetween via a communication link L12 formed by communication connection of the communication interface, the B-phase controller 20 and the C-phase controller 30 may perform communication and coordination therebetween via a communication link L23 formed by communication connection of the communication interface, and the C-phase controller 30 and the A-phase controller 10 may perform communication and coordination therebetween via a communication link L31 formed by communication connection of the communication interface.

In the invention, the phase controller of each phase circuit may receive signals sent from the phase controllers of other two phase circuits through the communication interface, thereby regulating the voltage of the bridge arm of the power conversion cell in the corresponding phase circuit. For example, the phase controller of each phase circuit may receive active power signals sent from the phase controllers of other two phase circuits, and regulates the voltage of the bridge arm of the power conversion cell in the corresponding phase circuit according to the active power signal of each phase circuit and current phase signal or voltage phase signal of the corresponding phase circuit.

The three-phase system of the invention performs distributed control by utilizing three-phase completely decentralized control with communication coordinated. That is, each of the phase converters is controlled by each phase controller, respectively, while control of each phase uses communication coordination, through which three-phase power grid currents are balanced, and three-phase DC voltages are stabilized.

In the invention, as for the delta-connection three-phase system and the Y-connection three-phase system, the three-phase distributed control can be used. Therefore, hereinafter referring to FIGS. 2 to 7, the specific contents of the invention are introduced respectively taking the delta-connection three-phase system and the Y-connection three-phase system for example.

Figure 2:
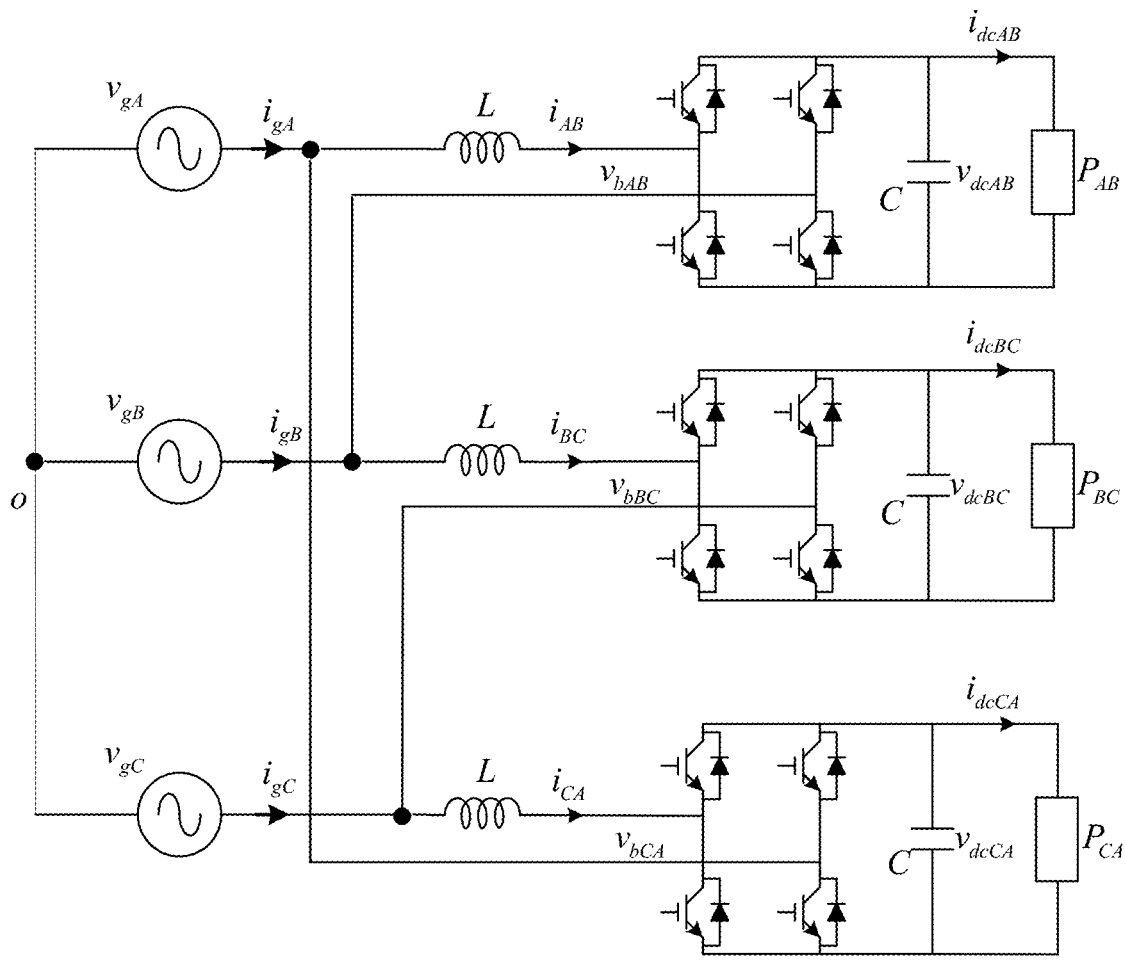
FIG. 2 is a schematic diagram illustrating a circuit of a delta-connection three-phase system according to the invention.

Distributed Control of the Delta-Connection Three-Phase System:

FIG. 2 illustrates a circuit of a typical combined type delta-connection three-phase system according to the invention. The delta-connection three-phase system is divided into AB, BC and CA phases, respectively, and each phase is a H-bridge rectifier circuit. In FIG. 2, $v_{gA}$, $v_{gB}$ and $v_{gC}$ are three-phase power grid voltages, $i_{gA}$, $i_{gB}$ and $i_{gC}$ are three-phase power grid currents, $i_{AB}$, $i_{BC}$, $i_{CA}$ are currents of three-phase converters, $v_{bAB}$, $v_{bBC}$ and $v_{bCA}$ are voltages of bridge arms of the three-phase converters, $v_{dcAB}$, $v_{dcBC}$ and $v_{dcCA}$ are three-phase DC voltages, and $P_{AB}$, $P_{BC}$ and $P_{CA}$ are three-phase load powers.

Figure 3A:
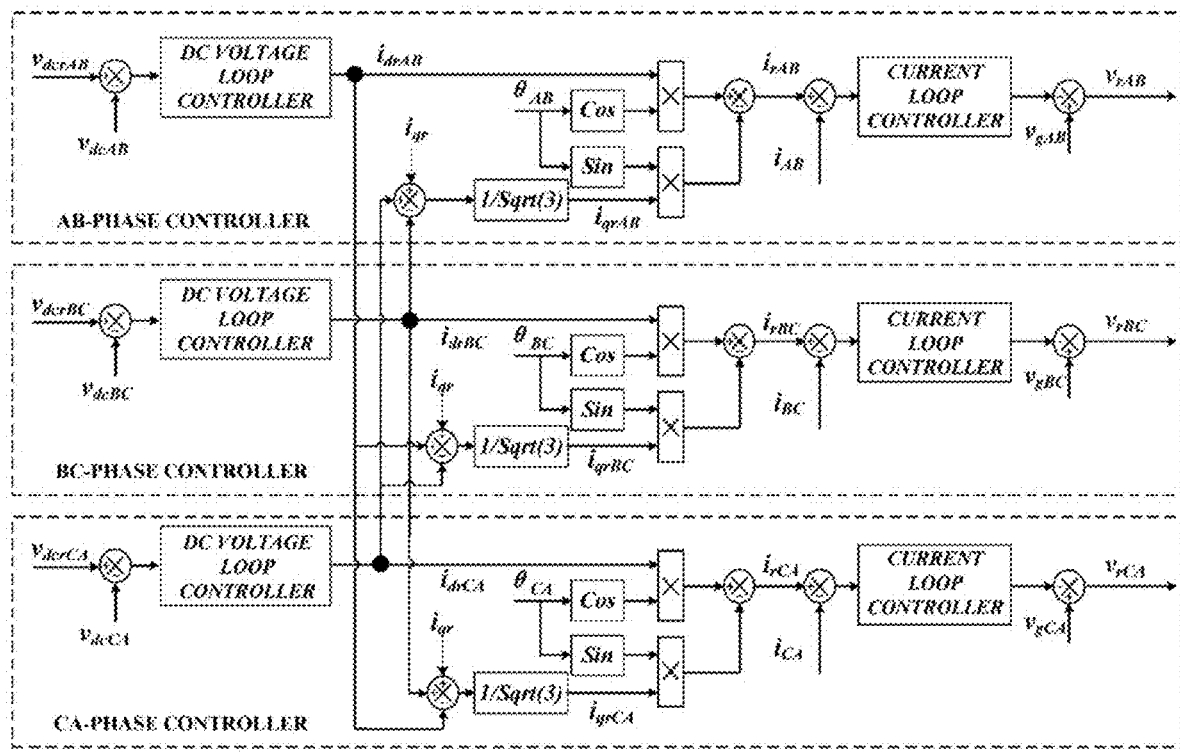
FIG. 3A is a schematic diagram illustrating a first preferable embodiment of a distributed control method of the delta-connection three-phase system according to the invention.

FIG. 3A illustrates a first preferable embodiment (a reactive current injection method) of a distributed control method of the delta-connection three-phase system according to the invention. In this embodiment, each phase has a DC voltage loop and a current loop itself. Hereinafter taking the AB phase as an example, detailed explanations are made, and other two phases are similar. $v_{dcrAB}$ is a DC voltage reference of AB phase, $v_{dcAB}$ is a DC voltage feedback of AB phase, and both of which are calculated to obtain an input of a DC voltage loop controller. For example, the DC voltage loop controller may be a proportional integral controller. Output of the DC voltage loop controller generates active current reference of the corresponding phase, and $i_{drAB}$ is a d-axis current reference of AB phase, i.e., an active current reference. Meanwhile, the active current reference of the corresponding phase is sent to other two phases for generating reactive current reference. The reactive current reference of the corresponding phase is $$i_{qrAB} = \frac{i_{qr} + i_{drCA} - i_{drBC}}{\sqrt{3}},$$

wherein $i_{qr}$ is a reactive current reference sent to the power grid, and is consistent for the three phases, while $i_{drCA}$ and $i_{drBC}$ are active current references sent from the CA phase and the BC phase. Generation manner of the reactive current references is the principle of coordination between the three phases: if one phase has a resistive load, it is possible to distribute a certain proportion of capacitive and inductive loads in other phases, so as to solve the problem of imbalance of the three-phase power grid currents. Further, an AC current reference is generated according to the active current reference and the reactive current reference, i.e., $i_{rAB}=i_{drAB} \cos \theta_{AB} - i_{qrAB} \sin \theta_{AB}$, wherein $\theta_{AB}$ is a phase angle of the power grid voltage of AB phase. $i_{AB}$ is a current feedback of the AB phase converter. $i_{AB}$ and $i_{rAB}$ are calculated to obtain an input of a current loop controller, and for example, the current loop controller may be a proportional resonant controller. $v_{gAB}=v_{gA}-v_{gB}$ is a power grid voltage of AB phase, which serves as a feedforward to eliminate influence of variation of the power grid voltage on current. Finally, $v_{gAB}$ and the output of the current loop controller are calculated to generate a modulation voltage reference $v_{rAB}$ of AB phase. Other two phases generate $v_{rBC}$ and $v_{rCA}$ using the same method, respectively. The modulation voltage references of three phases are subsequent modulated to output bridge arm voltages respectively.

Figure 3B:
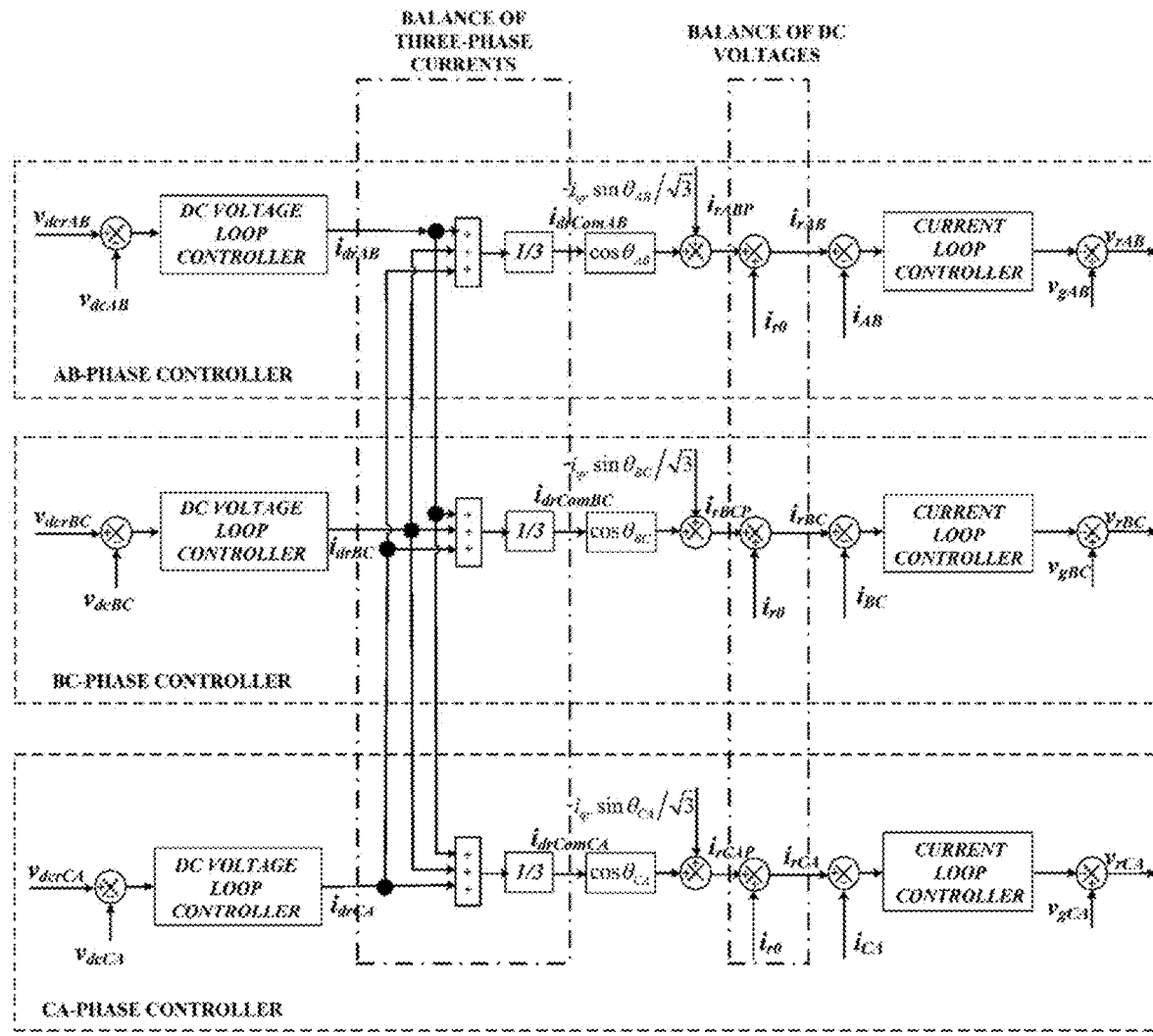
FIG. 3B is a schematic diagram illustrating a second preferable embodiment of a distributed control method of the delta-connection three-phase system according to the invention.

As can be seen, in the first preferable embodiment of FIG. 3A, each of the phase controllers in the delta-connection three-phase system may comprise: a DC voltage loop controller for receiving DC voltage reference and DC voltage feedback of the corresponding phase circuit, and outputting active current reference of the corresponding phase circuit; a three-phase current balancing module for receiving reactive current reference of a power grid and active current references of other two phase circuits sent from the phase controllers of other two phase circuits, and outputting reactive current reference of the corresponding phase circuit; an AC current reference generation module for generating AC current reference of the corresponding phase circuit according to the active current reference of the corresponding phase circuit, the reactive current reference of the corresponding phase circuit and the voltage phase signal of the corresponding phase circuit; and a current loop controller for receiving the AC current reference of the corresponding phase circuit and current feedback of the corresponding phase circuit, and outputting modulation voltage reference of the corresponding phase circuit; wherein the modulation voltage references of the three-phase circuits are modulated to output bridge arm voltage reference of each phase circuit, respectively, and the bridge arm voltage of each phase circuit may be regulated according to the bridge arm voltage reference. FIG. 3B illustrates a second preferable embodiment (a zero-sequence current injection method) of a distributed control method of the delta-connection three-phase system, which differs from the reactive current injection method shown in FIG. 3A in the implementation of coordination portion. The method of obtaining active current references of the three phases is the same as that in the first preferable embodiment, and the details are not described here. The active current references of the three phases are averaged to obtain a balance current reference of the phase, i.e., $i_{drComAB}=\frac{1}{3}(i_{drAB}+i_{drBC}+i_{drCA})$. Then, an AC current reference is generated according to the balance current reference of the corresponding phase, the phase angle and the reactive current reference of the corresponding phase, i.e., $$i_{rABP} = i_{drComAB} \cos \theta_{AB} - \frac{1}{\sqrt{3}} i_{qr} \sin \theta_{AB},$$

and a zero-sequence current is injected to balance the three-phase DC voltage. An expression of the zero-sequence current is $$i_{r0} = \frac{2}{3}[i_{drAB} \cos \theta_{AB} + i_{drBC} \cos \theta_{BC} + i_{drCA} \cos \theta_{CA}],$$

wherein $i_{drAB}$ is a output of the DC voltage loop of AB phase, and is an active current reference of AB phase that reflects active power signal of AB phase, $\theta_{AB}$ is an phase angle of the power grid voltage of AB phase that reflects power grid voltage phase signal of AB phase, and meanings of variables corresponding to subscripts BC and CA are similar with that of the AB phase. Since the zero-sequence current circulates among the three phases, and does not flow into the power grid, the zero-sequence current does not have influence on balance of the three-phase power grid currents.

As can be seen, in the second embodiment shown in FIG. 3B, each of the phase controllers in the delta-connection three-phase system may comprise: a DC voltage loop controller for receiving DC voltage reference and DC voltage feedback of the corresponding phase circuit, and outputting active current reference of the corresponding phase circuit; a three-phase current balancing module for receiving the active current reference of the corresponding phase circuit and active current references of other two phase circuits sent by the phase controllers of other two phase circuits, and outputting balance current reference of the corresponding phase circuit; an AC current reference generation module for generating AC current reference of the corresponding phase circuit according to a reactive current reference of a power grid, the balance current reference of the corresponding phase circuit, and the voltage phase signal of the corresponding phase circuit; a DC voltage balancing module for generating AC current reference of the corresponding phase circuit according to the AC current reference of the corresponding phase circuit and a zero-sequence current; and a current loop controller for receiving the AC current reference of the corresponding phase circuit and current feedback of the corresponding phase circuit, and outputting modulation voltage reference of the corresponding phase circuit; wherein the modulation voltage references of the three-phase circuits are modulated to output bridge arm voltage reference of each phase circuit, respectively, and the bridge arm voltage of each phase circuit may be regulated according to the bridge arm voltage references.

Moreover, in this embodiment, each of the phase controllers generates active power signal (i.e. active current reference in this embodiment) reflecting active power of the corresponding phase circuit according to voltage signal (i.e. DC voltage reference and DC voltage feedback in this embodiment) of the corresponding phase circuit, respectively, receives the active power signals of other two phase circuits, and generates the zero-sequence current according to the active power signal of each phase circuits and the voltage phase signal of each phase circuits.

Control effects of the two embodiments in FIGS. 3A and 3B are equivalent, and both can balance three-phase current, and stabilize three-phase DC voltages.

Figure 4:
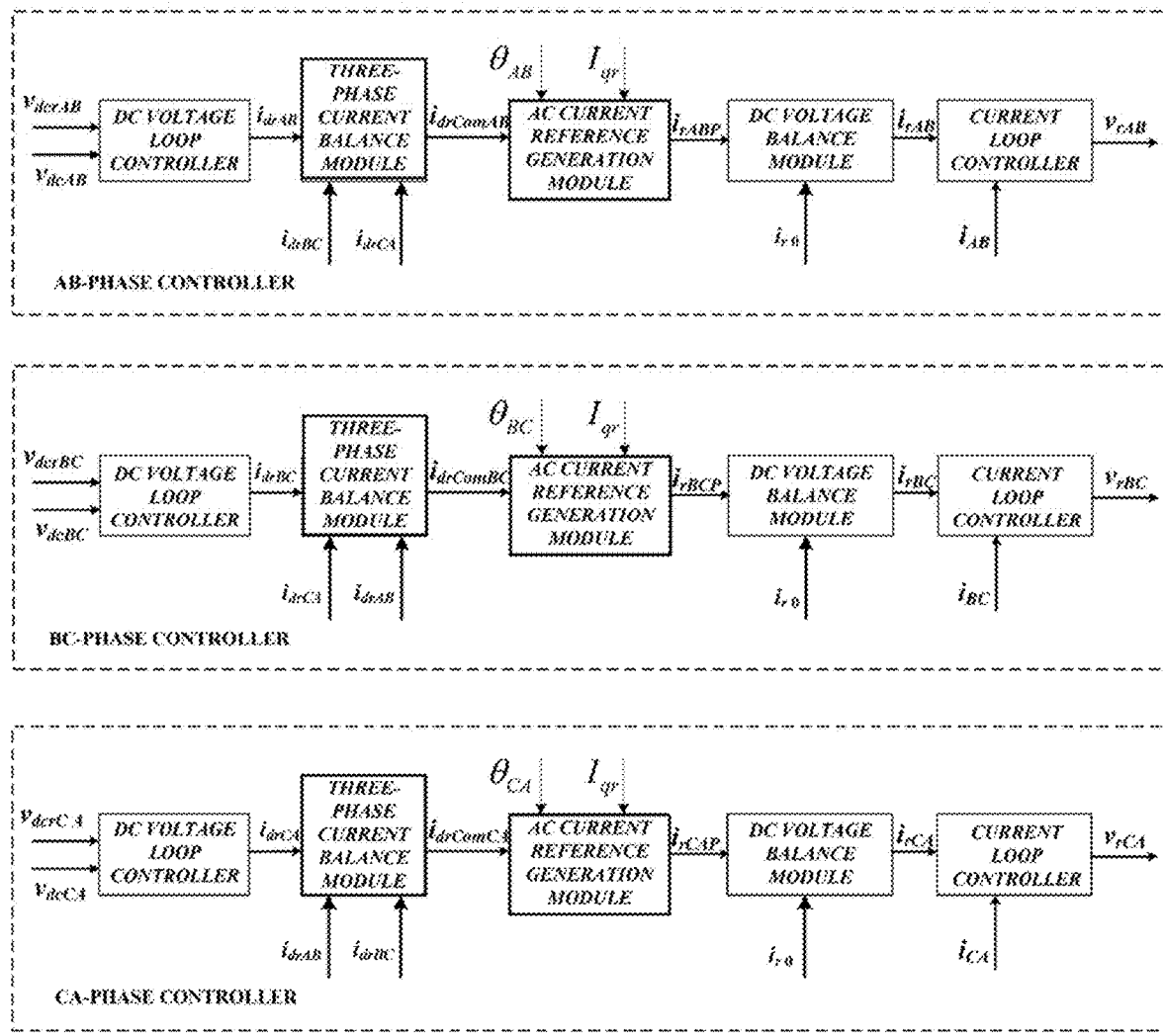
FIG. 4 illustrates a general block diagram of a distributed control method of the delta-connection three-phase system according to the invention.

FIG. 4 illustrates a general block diagram of a distributed control method of the delta-connection three-phase system according to the invention, wherein $i_{drAB}$, $i_{drCA}$, $i_{drBC}$ and $i_{r0}$ are amounts need for communication coordination. The block diagram generalizes the foregoing two embodiments, and each of the phase controllers in the delta-connection three-phase system comprises a DC voltage loop controller, a three-phase current balancing module, an AC current reference generation module, a DC voltage balancing module and a current loop controller.

Figure 5:
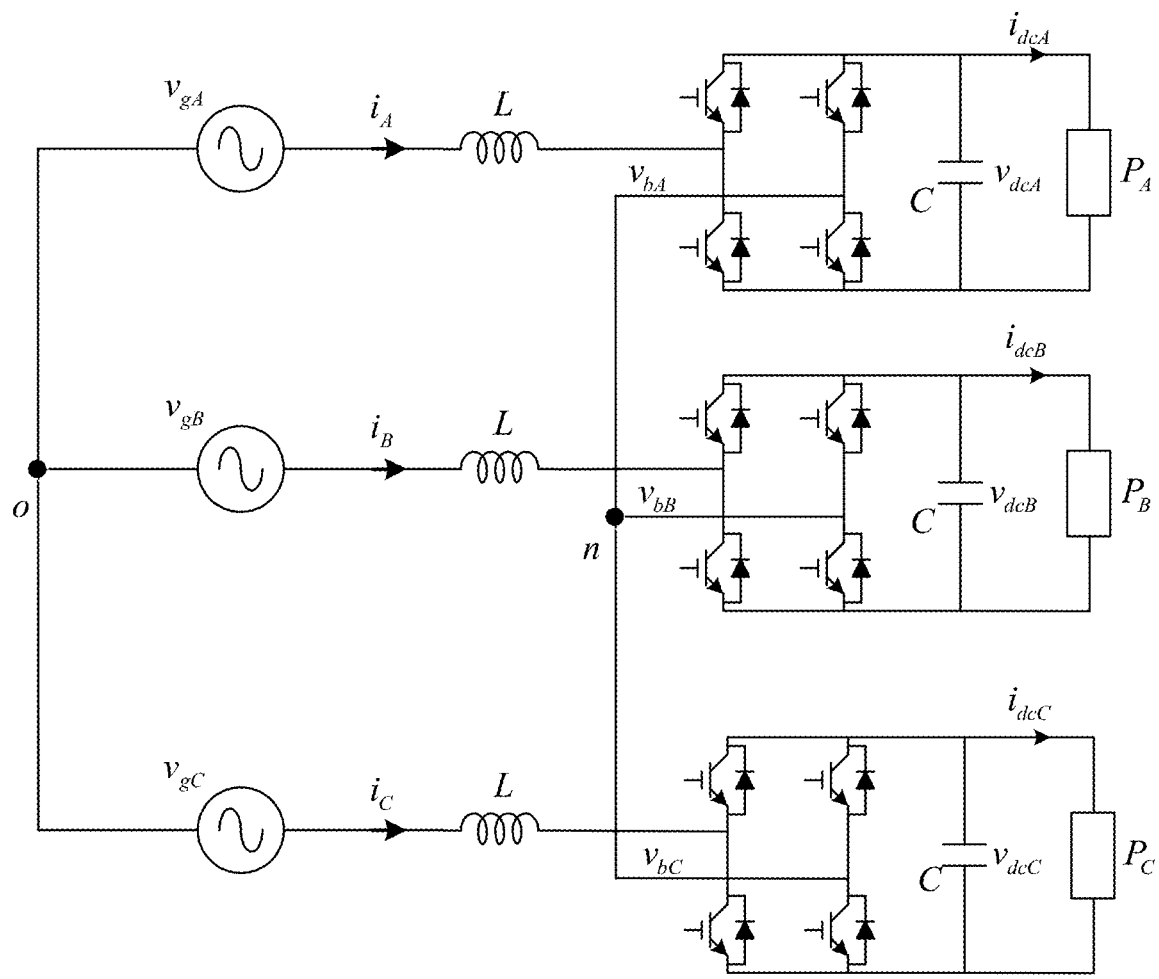
FIG. 5 is a schematic diagram illustrating a circuit of a Y-connection three-phase system according to the invention.

Distributed Control of the Y-Connection Three-Phase System:

FIG. 5 illustrates a circuit of the Y-connection three-phase system according to the invention. In FIG. 5, $v_{gA}$, $v_{gB}$ and $v_gC$ are three-phase power grid voltages, $i_A$, $i_B$ and $i_C$ are three-phase power grid currents, and are also currents of three-phase converters, $v_{bA}$, $v_{bB}$ and $v_{bC}$ are bridge arm voltages of the three-phase converters, $v_{dcA}$, $v_{dcB}$ and $v_{dcC}$ are three-phase DC voltages, and $P_A$, $P_B$ and $P_C$ are three-phase load powers.

Figure 6:
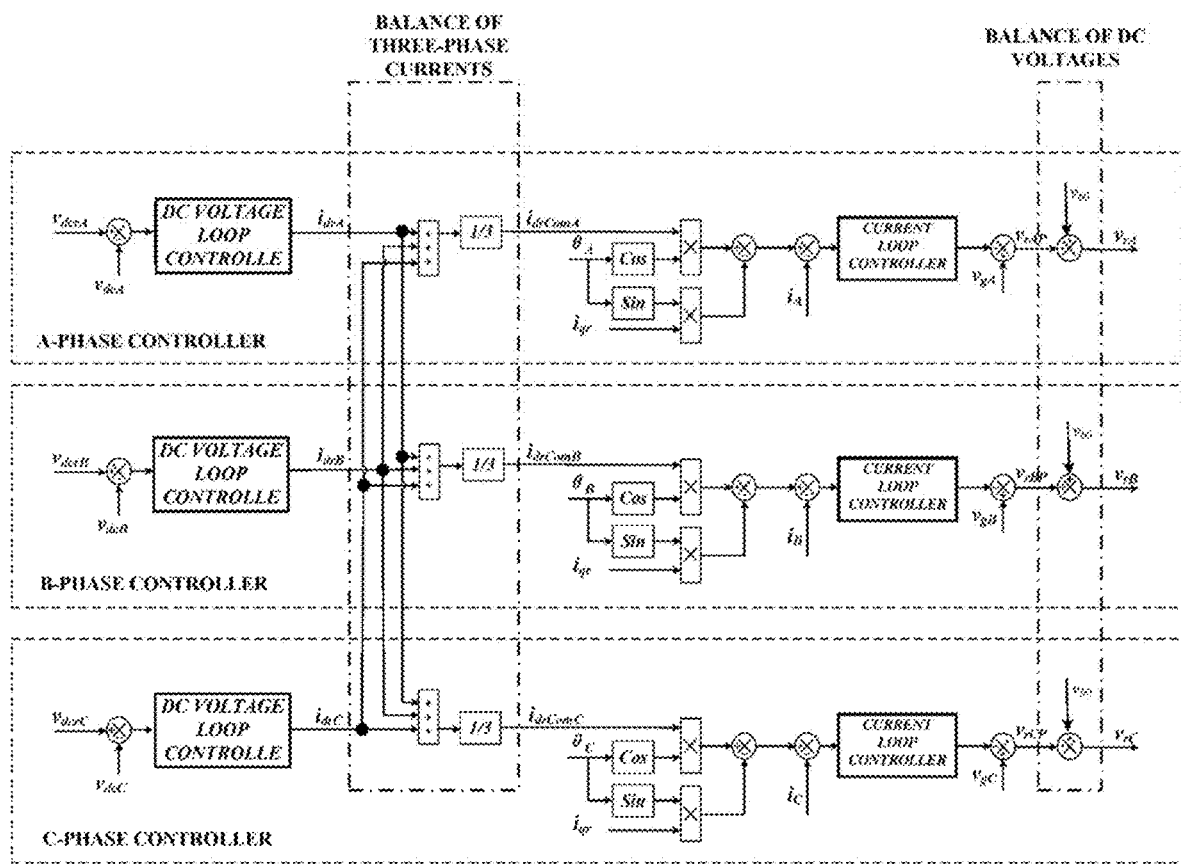
FIG. 6 is a schematic diagram illustrating a distributed control method of the Y-connection three-phase system according to the invention.

FIG. 6 illustrates a block diagram of distributed control of the Y-connection three-phase system according to the invention. In this embodiment, each phase has a DC voltage loop and a current loop itself. Hereinafter taking the A phase as an example, detailed explanations are made, and other two phases are similar. $v_{dcrA}$ is a DC voltage reference of A phase, $v_{dcA}$ is a DC voltage feedback of A phase, and both are calculated to obtain an inputs of the DC voltage loop controller. For example, the DC voltage loop controller may be a proportional integral controller. Output of the DC voltage loop controller generates an active current reference $i_{drA}$ of the corresponding phase. Then, active current references $i_{drB}$ and $i_{drC}$ of other two phases are received to generate a balance current reference $$i_{drComA} = \frac{i_{drA} + i_{drB} + i_{drC}}{3}$$

of the corresponding phase. The function of averaging the active current references of the three phases is to balance three-phase currents. Further, an AC current reference is generated according to the balance current reference, and the voltage phase signals and the reactive current reference of the corresponding phase, i.e., $i_{rA}=i_{drComA}\cos\theta_A-i_{qr}\sin\theta_A$, wherein $\theta_A$ is a phase angle of the power grid voltage of A phase that reflects the voltage phase signal of the A phase. $i_A$ is a current feedback of the A phase converter. The AC current reference of the A phase and the current feedback of the A phase converter are calculated to obtain an input of a current loop controller, and for example, the current loop controller may be a proportional resonant controller. $v_{gA}$ is a power grid voltage of A phase, and serves as a feedforward to be injected into output of the current loop controller to eliminate influence of variation of the power grid voltage on current. In addition, a zero-sequence voltage is injected to balance three-phase DC voltages. An expression of the zero-sequence voltage $v_{b0}$ is:

$$v_{b0}=k_0(i_A i_{drA}+i_B i_{drB}+i_C i_{drC}).$$

wherein $i_A$, $i_B$ and $i_C$ are respectively current feedbacks of the three phases that reflect current phase signal of each phase, $i_{drA}$, $i_{drB}$ and $i_{drC}$ are outputs of the DC voltage loop controller of each phase, and are active current references of each phase that reflect active power signal of each phase, and $k_0$ is a proportional coefficient, such as a constant or a value according to a current amplitude. For example, the smaller the current amplitude is, the larger $k_0$ will be, and a preferable formula of $k_0$ is $$k_0 = \frac{V_{gM}}{i_A^2 + i_B^2 + i_C^2},$$

wherein $V_{gM}$ is a peak value of the power grid voltage. As can be seen from the expression of the zero-sequence voltage, when the active power of which phase is largest, the phase of the zero-sequence voltage is proximate to the phase of a current of which phase. When the three-phase currents and the three-phase power grid voltages are balanced, the injected zero-sequence voltage cause imbalance of the three-phase bridge arm voltages, and imbalance of powers absorbed by bridge arms to deal with imbalance of load powers at DC sides, thereby keep stabilization of the DC voltages. Since the injected zero-sequence voltage in the Y-connection three-phase system dose not generate a zero-sequence current, thereby the balance of three-phase current is not influenced. The output of the current loop controller is injected into the A-phase power grid voltage to generate an output voltage reference $v_{rAP}$. The output voltage reference $v_{rAP}$ and the zero-sequence voltage $v_{b0}$ are added to finally generate modulation voltage references $v_{rA}$, $v_{rB}$ and $v_{rC}$ can also be generated in the same way. And bridge arm voltages are outputted after modulating $v_{rA}$, $v_{rB}$ and $v_{rC}$.

Figure 7:
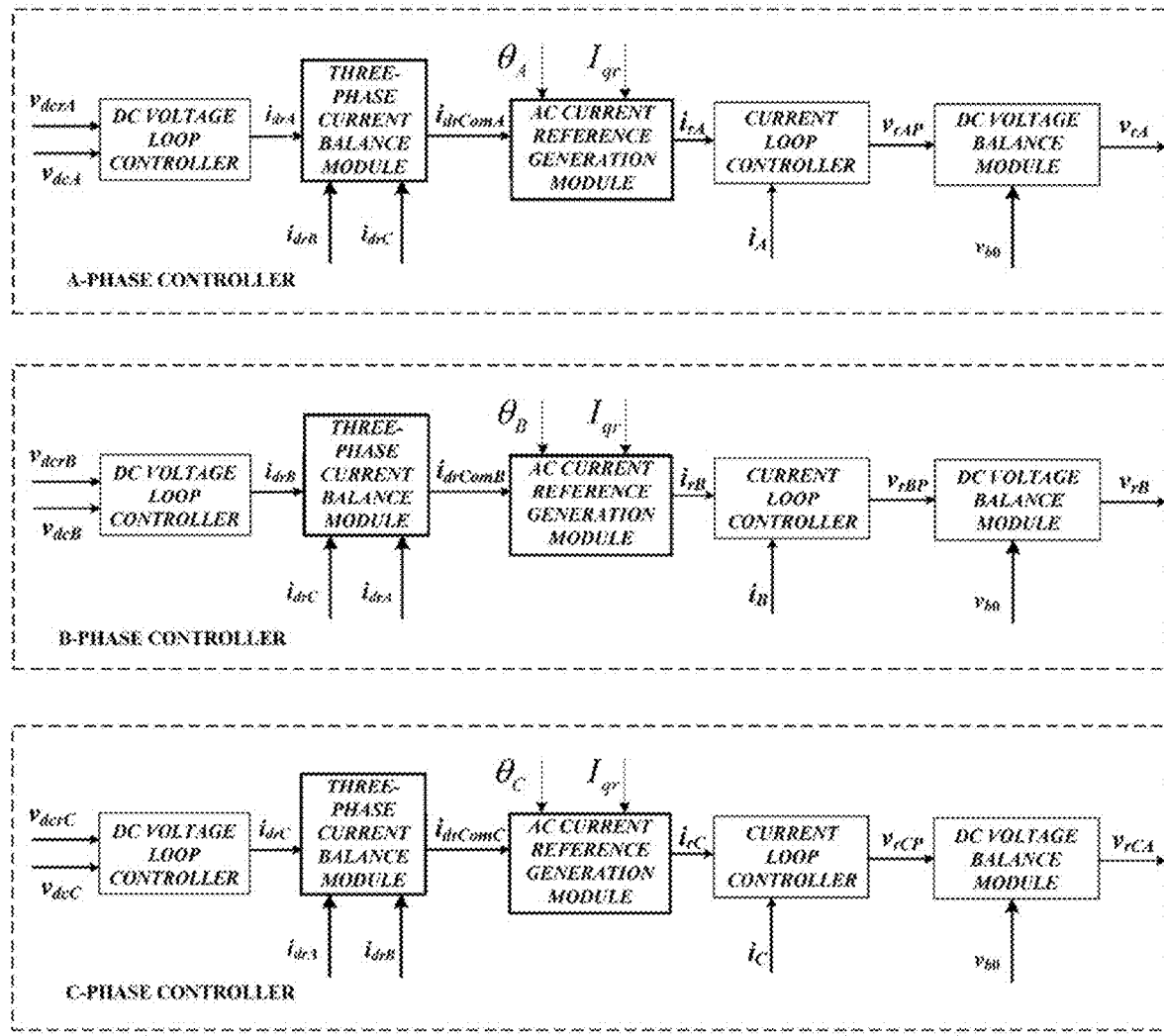
FIG. 7 illustrates a general block diagram of a distributed control method of the Y-connection three-phase system according to the invention.

FIG. 7 illustrates a general block diagram of a distributed control method of the Y-connection three-phase system according to the invention, wherein $i_{drA}$, $i_{drB}$, $i_{drB}$ and $v_{b0}$ are values with communication coordination. The Y-connection three-phase system comprises a DC voltage loop controller, a three-phase current balancing module, an AC current reference generation module, a current loop controller and a DC voltage balancing module. Difference from a coordination cell of the delta-connection three-phase system is that a zero-sequence voltage of the Y-connection three-phase system is added to output of the current loop.

As can be seen, each of the phase controllers in the Y-connection three-phase system of the invention may comprise: a DC voltage loop controller for receiving DC voltage reference and DC voltage feedback of the corresponding phase circuit, and outputting active current reference of the corresponding phase circuit; a three-phase current balancing module for receiving the active current reference of the corresponding phase circuit and active current references of other two phase circuits sent from the phase controllers of other two phase circuits, and outputting balance current references of the phase circuit; an AC current reference generation module for generating AC current reference of the corresponding phase circuit according to a reactive current reference of a power grid, the balance current reference of the corresponding phase circuit, and the voltage phase signal of the corresponding phase circuit; a current loop controller for receiving the AC current reference of the corresponding phase circuit and current feedback of the corresponding phase circuit, and generating output voltage reference of the corresponding phase circuit; and a DC voltage balancing module for generating modulation voltage reference of the corresponding phase circuit according to the output voltage reference of the corresponding phase circuit and a zero-sequence voltage; wherein the modulation voltage references of the three-phase circuits are modulated to output bridge arm voltage reference of each phase circuit, respectively, and the bridge arm voltage of each phase circuit is regulated according to the bridge arm voltage references.

In this embodiment, each of the phase controllers generates active power signal reflecting active power of the corresponding phase circuit according to voltage signal reflecting the voltage of corresponding phase circuit, respectively, and receives the active power signals of other two phase circuits, and generates the zero-sequence voltage according to the active power signal reflecting the active power of each phase circuits and the current phase signal of each phase circuits.

Figure 8:
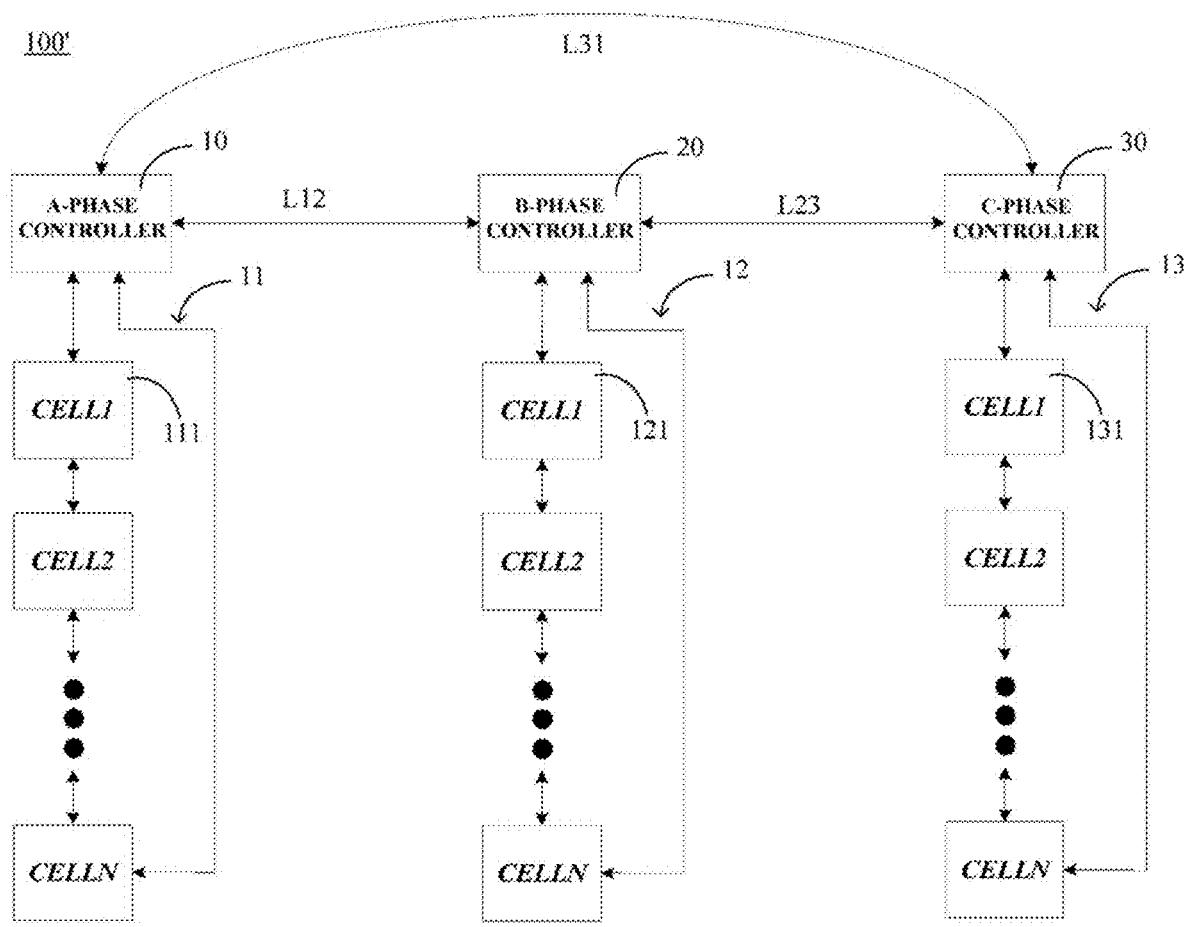
FIG. 8 is a structural diagram of a three-phase system according to other preferable embodiment of the invention, wherein each phase circuit comprises a plurality of power conversion cells connected in series.

With respect to the circumstance that each phase circuit has only one converter, the foregoing disclosures give embodiments of distributed control. However, it shall be understood that as shown in FIG. 8, when each phase circuit 11, 12 and 13 includes a plurality of power conversion cells 111, 121 and 121, i.e., formed by connecting a plurality of converter cells CELL 1 to CELL N in series, for example, a three-phase cascade H-bridge system, an implementation architecture of the controller shown in FIG. 8 may be used. Accordingly, DC voltage feedbacks in the respective phase controllers 10, 20 and 30 shall be a sum of DC voltages of all converter cells of the respective phase circuits.

For example, each phase circuit may be formed by connecting N converter cells CELL 1 to CELL N in series, and N is reasonably designed depending on voltage classes of the system and a rated voltage of each converter cell. For example, in a 11 KV system, when a DC voltage of each converter cell is 1600V, it is possible to design N=8 or N=9. In the embodiment of FIG. 8, the plurality of converter cells (i.e., power conversion cells) of each phase circuit and the corresponding phase controllers are in serial communications connection, and form a loop network. The plurality of converter cells in each phase circuit may be loop communication, and the respective controllers also may be loop communication. Of course, it shall be understood that communication among the plurality of power conversion cells of each phase circuit also may be bus communication or star communication, and communication among the phase circuits also may be bus communication or star communication, but the invention is not limited thereto.

Figure 9A:
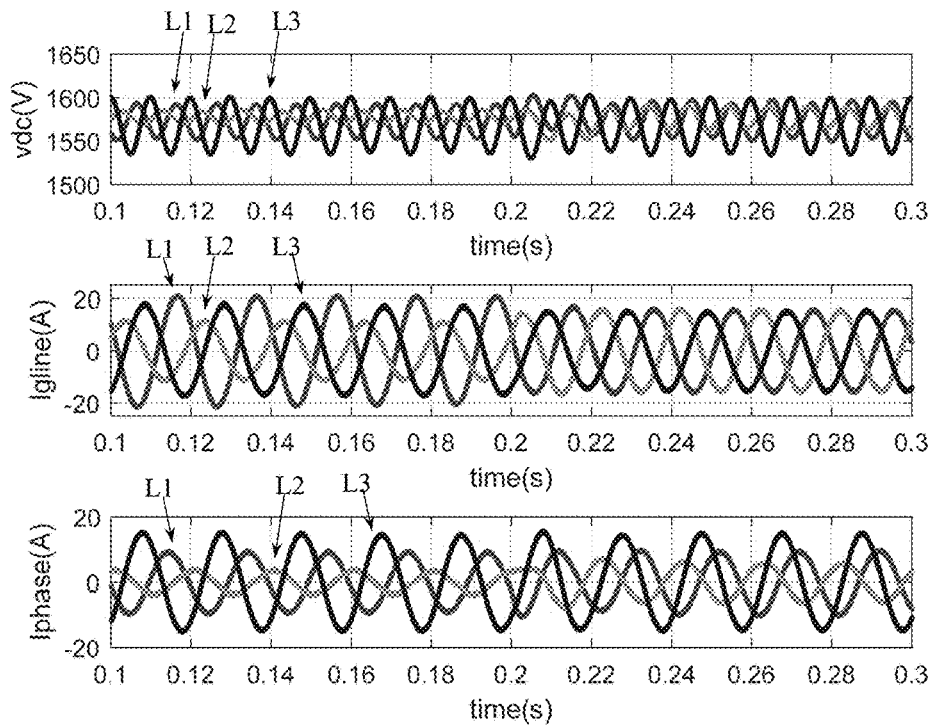
FIG. 9A illustrates effects of the delta-connection three-phase system in the distributed control according to the invention.

Technical effects of the invention are as follows:

FIG. 9A illustrates effects of distributed control method of the delta-connection three-phase system according to the invention, wherein a top channel $V_{dc}$ is three-phase DC voltages, a middle channel $I_{gline}$ is three-phase power grid currents, and a bottom channel $I_{phase}$ is bridge arm currents of three-phase converters. L1, L2 and L3 represent AB, BC and CA phases, respectively. Waveforms in FIG. 9A are obtained under operating conditions of imbalance of loads at three-phase DC sides, and load currents at the DC sides of the AB, BC and CA phases are 3 A, 1 A and 5 A, respectively. Before 0.2 s, the three phases are completely independent distributed controlled. As can be seen, the three-phase power grid currents and the power grid currents of the three-phase converters are unbalanced, because of differences of three-phase load powers. An average value of the three-phase DC voltages is balanced, and amplitudes of double frequency fluctuation of the three-phase DC voltages are different. After 0.2 s, distributed control provided by the invention is used. The three-phase power grid currents are balanced, and the three-phase DC voltages are also balanced through coordination control. Although bridge arm currents of the three-phase converter are still unbalanced, only if the three-phase power grid currents are balanced, it satisfys requirements for the power grid, so the method provided by the invention can satisfy the requirements for the power grid.

Figure 9B:
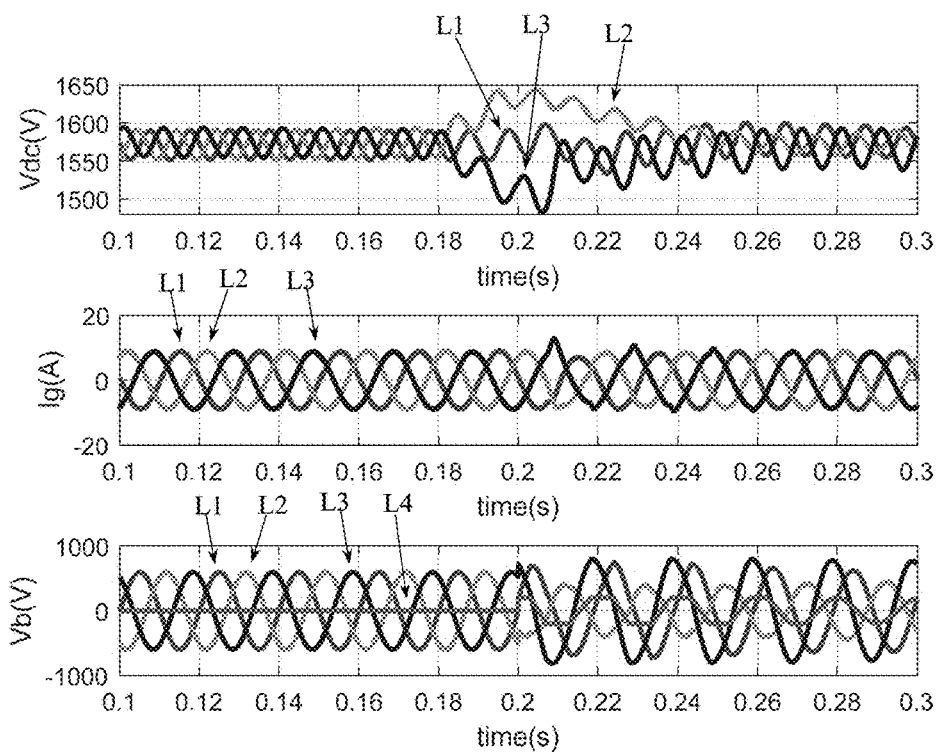
FIG. 9B illustrates effects of the Y-connection three-phase system in distributed control according to the invention.

FIG. 9B illustrates distributed control effects of the Y-connection three-phase system according to the invention, wherein a top channel $V_{dc}$ is three-phase DC voltages, a middle channel $I_g$ is three-phase power grid currents, and a bottom channel $V_b$ is bridge arm voltages of three-phase converters and a zero-sequence voltage. L1, L2 and L3 represent AB, BC and CA phases, respectively, and L4 represents the zero-sequence voltage. Before 0.18 s, an operating condition is set that DC loads are balance, and stabilization is also possible without adding the control of the invention. However, after 0.18 s, the operating condition is set that the loads at three-phase DC sides are imbalance, and currents at the DC sides are 3 A, 2 A and 4 A, respectively. As can be seen, the three-phase DC voltages cannot be stabilized. After 0.2 s, distributed control provided by the invention is used, and a zero-sequence voltage is injected through coordination. As can be seen, the bridge arm voltages of the three phases are no longer balanced, and work with the three-phase balanced power grid currents to generate unbalanced bridge arm powers, so as to deal with different load powers at the DC sides, such that the three-phase DC voltages are stabilized and balanced, and the three-phase power grid currents are also balanced.

Figure 9C:
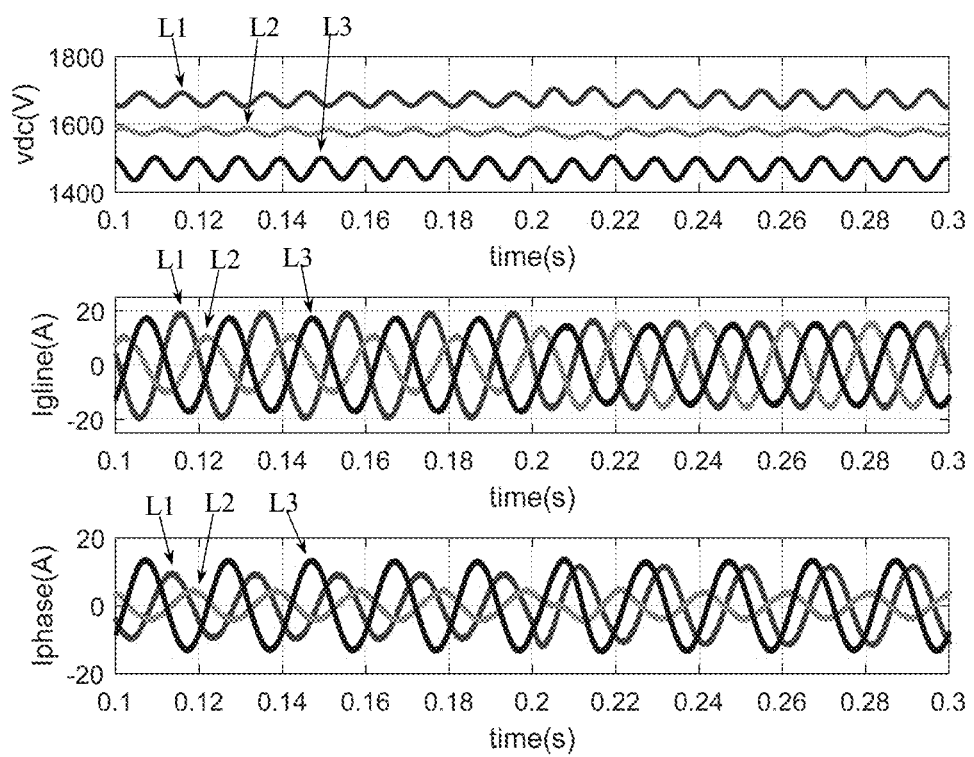
FIG. 9C illustrates effects when three-phase DC voltages are stably operated at different values in the distributed control method of the invention.

Since the three-phase DC voltages of the invention are controlled, respectively, when references of the three-phase DC voltages are different, it is also possible to stably operate, which is difficult for centralized control, because there is only one centralized DC voltage loop, and it is difficult to give three different DC voltage references, respectively. Distributed control of the three-phase system of the invention is operated in an operating condition where the three-phase DC voltage references are set to be different. For example, three-phase battery voltages in photovoltaic application are different, and effects are shown in FIG. 9C. The three-phase DC voltages may be operated in 1680V, 1580V and 1480V, respectively.

In addition, the invention further provides a three-phase system, comprising: three-phase circuit, each phase circuit of the three-phase circuit including at least one power conversion cell; and at least three phase controllers for correspondingly controlling each phase circuit, respectively, wherein each of the phase controllers generates active power signal XA, XB and XC reflecting active powers of the corresponding phase circuit according to voltage signal reflecting the voltage of corresponding phase circuit, respectively; each of the phase controllers also receives active power signals reflecting active powers of other two phase circuits, and generate zero-sequence component according to the active power signal XA, XB and XC reflecting active power of each phase circuit and phase signal YA, YB and YC reflecting current phase or voltage phase of each phase circuit, wherein, the zero-sequence component=(XA×YA+XB×YB+XC×YC)×K0, where K0 is a proportional coefficient; each of the phase controllers also regulate bridge arm voltages of the respective power conversion cells in the corresponding phase circuit according to the zero-sequence component correspondingly.

Preferably, the three-phase system, for example, may be a delta-connection three-phase system shown in FIG. 2. As shown in FIG. 4, the active power signals of each phase circuit may be active current references $i_{drAB}$, $i_{drBC}$ and $i_{drCA}$ of each phase circuit, and the phase signals of each phase circuit may be voltage phase signals $\theta_{AB}$, $\theta_{BC}$ and $\theta_{CA}$ of each phase circuit. Each of the phase controllers may generate a zero-sequence current $i_{r0}$ according to the active current references $i_{drAB}$, $i_{drBC}$ and $i_{drCA}$ reflecting the active power signal of the respective phase circuits and the voltage phase signals $\theta_{AB}$, $\theta_{BC}$ and $\theta_{CA}$ reflecting voltage phases of the respective phase circuits. The active current references $i_{drAB}$, $i_{drBC}$ and $i_{drCA}$ reflecting the active power signal of the respective phase circuits are the active current reference reflecting the active power of the phase circuit and active current references reflecting active powers of other two phase circuits received by each of the phase controllers.

More specifically, each of the phase controllers in the delta-connection three-phase system may comprise: a DC voltage loop controller for receiving DC voltage reference $v_{dcrAB}$, $v_{dcrBC}$, $v_{dcrCA}$ and DC voltage feedback $v_{dcAB}$, $v_{dcBC}$, $v_{dcCA}$ of the corresponding phase circuit, and outputting active current reference $i_{drAB}$, $i_{drBC}$, $i_{drCA}$ of the corresponding phase circuit; a three-phase current balancing module for receiving the active current reference of the corresponding phase circuit and active current references of other two phase circuits sent from the phase controllers of other two phase circuits, and outputting balance current reference $i_{drComAB}$, $i_{drComBC}$, $i_{drComCA}$ of the corresponding phase circuit; an AC current reference generation module for generating AC current reference $i_{rABP}$, $i_{rBCP}$, $i_{rCAP}$ of the corresponding phase circuit according to a reactive current reference $I_{qr}$ of a power grid, the balance current reference $i_{drComAB}$, $i_{drComBC}$, $i_{drComCA}$ of the corresponding phase circuit, and the voltage phase signal $\theta_{AB}$, $\theta_{BC}$, $\theta_{CA}$ of the corresponding phase circuit; a DC voltage balancing module for generating AC current references $i_{rAB}$, $i_{rBC}$, $i_{rCA}$ of the corresponding phase circuit according to the AC current reference $i_{rABP}$, $i_{rBCP}$, $i_{rCAP}$ of the corresponding phase circuit and a zero-sequence current $i_{r0}$; and a current loop controller for receiving the AC current reference $i_{rAB}$, $i_{rBC}$, $i_{rCA}$ of the corresponding phase circuit and current feedback $i_{AB}$, $i_{BC}$, $i_{CA}$ of the corresponding phase circuit, and outputting modulation voltage reference $v_{rAB}$, $v_{rBC}$, $v_{rCA}$ of the corresponding phase circuit; wherein the modulation voltage references $v_{rAB}$, $v_{rBC}$, $v_{rCA}$ of the three-phase circuits are modulated to output bridge arm voltage reference of each phase circuit, respectively, and the bridge arm voltage of each phase circuit is regulated according to the bridge arm voltage reference.

Preferably, the three-phase system may be a Y-connection three-phase system shown in FIG. 5. As shown in FIG. 7, the active power signals of each phase circuit may be active current references $i_{drA}$, $i_{drB}$ and $i_{drC}$ of each phase circuit, and the phase signals of each phase circuit may be phase signals of three phase current feedback $i_A$, $i_B$ and $i_C$ respectively. Each of the phase controllers may receive active current references reflecting active powers of other two phase circuits, and generate a zero-sequence voltage $v_{b0}$ according to the active current references $i_{drA}$, $i_{drB}$, $i_{drC}$ reflecting the active power signal of the respective phase circuits and the current phase signals $i_A$, $i_B$, $i_C$ reflecting current phases of the respective phase circuits.

More specifically, each of the phase controllers in the Y-connection three-phase system may comprise: a DC voltage loop controller for receiving DC voltage reference $v_{dcrA}$, $v_{dcrB}$, $v_{dcrC}$ and DC voltage feedback $v_{dc}$, $v_{dc}$, $v_{dc}$ of the corresponding phase circuit, and outputting active current reference $i_{drA}$, $i_{drB}$, $i_{drC}$ of the corresponding phase circuit; a three-phase current balancing module for receiving the active current reference of the corresponding phase circuit and active current references of other two phase circuits sent from the phase controllers of other two phase circuits, and outputting balance current reference $i_{drComA}$, $i_{drComB}$, $i_{drComC}$ of the corresponding phase circuit; an AC current reference generation module for generating AC current reference $i_{rA}$, $i_{rB}$, $i_{rC}$ of the corresponding phase circuit according to a reactive current reference $I_{qr}$ of a power grid, the balance current reference $i_{drComA}$, $i_{drComB}$, $i_{drComC}$ of the corresponding phase circuit, and the voltage phase signal $\theta_A$, $\theta_B$, $\theta_C$ of the corresponding phase circuit; a current loop controller for receiving the AC current reference $i_{rA}$, $i_{rB}$, $i_{rC}$ of the corresponding phase circuit and current feedback $i_A$, $i_B$, $i_C$ of the corresponding phase circuit, and outputting output voltage reference $v_{rAP}$, $v_{rBP}$, $v_{rCP}$ of the corresponding phase circuit; and a DC voltage balancing module for generating modulation voltage reference $v_{rA}$, $v_{rB}$, $v_{rC}$ of the corresponding phase circuit according to the output voltage reference $v_{rAP}$, $v_{rBP}$, $v_{rCP}$ of the corresponding phase circuit and a zero-sequence voltage $v_{b0}$; wherein the modulation voltage references $v_{rA}$, $v_{rB}$, $v_{rC}$ of the three-phase circuits are modulated to output bridge arm voltage reference of each phase circuit, respectively, and the bridge arm voltage of each phase circuit is regulated according to the bridge arm voltage references.

Correspondingly, the invention provides a distributed control method of a three-phase system, wherein the three-phase system comprises: three-phase circuits, each phase circuit of the three-phase circuit including at least one power conversion cell; and at least three phase controllers for controlling each phase circuit, respectively, each of the phase controllers including a communication interface through which the at least three phase controllers are in communications connection with each other, wherein the distributed control method comprises:

when loads at DC sides of the three-phase system are unbalanced, generating, by each of the phase controllers, active power signal XA, XB, XC reflecting active power of the corresponding phase circuit according to voltage signal of the corresponding phase circuit, respectively;

receiving, by each of the phase controllers, active power signals reflecting active powers of other two phase circuits, and generating zero-sequence components according to the active power signals XA, XB and XC reflecting active powers of each phase circuits and phase signals YA, YB and YC reflecting current phases or voltage phases of each phase circuits, wherein the zero-sequence components=(XA×YA+XB×YB+XC×YC)×K0, where K0 is a proportional coefficient;

regulating, by each of the phase controllers, bridge arm voltages of the respective power conversion cells in the corresponding phase circuit according to the zero-sequence components correspondingly.

The three-phase system may be a delta-connection three-phase system, the active power signal of each phase circuit may be active current reference of each phase circuit, and the phase signal of each phase circuit may be voltage phase signal of each phase circuit. Each of the phase controllers receives active current references reflecting active powers of other two phase circuits. Each of the phase controllers may generate a zero-sequence current according to the active current reference reflecting active power of each phase circuits and the voltage phase signal reflecting voltage phase of each phase circuits.

More specifically, each of the phase controllers in the delta-connection three-phase system may comprise: a DC voltage loop controller for receiving DC voltage reference and DC voltage feedback of the corresponding phase circuit, and outputting active current reference of the corresponding phase circuit; a three-phase current balancing module for receiving the active current reference of the corresponding phase circuit and active current references of other two phase circuits sent from the phase controllers of other two phase circuits, and outputting balance current reference of the corresponding phase circuit; an AC current reference generation module for generating AC current reference of the corresponding phase circuit according to a reactive current reference of a power grid, the balance current reference of the corresponding phase circuit, and the voltage phase signal of the corresponding phase circuit; a DC voltage balancing module for generating AC current reference of the corresponding phase circuit according to the AC current reference of the corresponding phase circuit and a zero-sequence current; and a current loop controller for receiving the AC current reference of the corresponding phase circuit and current feedback of the corresponding phase circuit, and outputting modulation voltage reference of the corresponding phase circuit; wherein the modulation voltage references of the three-phase circuits are modulated to output bridge arm voltage reference of each phase circuit, respectively, and the bridge arm voltage of each phase circuit is regulated according to the bridge arm voltage reference.

The three-phase system also may be a Y-connection three-phase system, the active power signal of each phase circuit may be active current reference of each phase circuit, and the phase signal of each phase circuit may be current phase signal of each phase circuit. Each of the phase controllers receives active current references reflecting active powers of other two phase circuits. Each of the phase controllers may generate a zero-sequence voltage according to the active current references reflecting active power of each phase circuits and the current phase signals reflecting current phases of each phase circuits.

More specifically, each of the phase controllers in the Y-connection three-phase system may comprise: a DC voltage loop controller for receiving DC voltage reference and DC voltage feedback of the corresponding phase circuit, and outputting active current reference of the corresponding phase circuit; a three-phase current balancing module for receiving the active current reference of the corresponding phase circuit and active current references of other two phase circuits sent from the phase controllers of other two phase circuits, and outputting balance current reference of the corresponding phase circuit; an AC current reference generation module for generating AC current reference of the corresponding phase circuit according to a reactive current reference of a power grid, the balance current reference of the phase circuit, and the voltage phase signals of the phase circuit; a current loop controller for receiving the AC current reference of the corresponding phase circuit and current feedback of the corresponding phase circuit, and outputting output voltage reference of the corresponding phase circuit; and a DC voltage balancing module for generating modulation voltage reference of the corresponding phase circuit according to the output voltage reference of the corresponding phase circuit and a zero-sequence voltage; wherein the modulation voltage references of the three-phase circuits are modulated to output bridge arm voltage reference of each phase circuit, respectively, and the bridge arm voltage of each phase circuit is regulated according to the bridge arm voltage reference.

To sum up, the three-phase system and the distributed control method thereof in the invention solve problems of balance of three-phase currents and stabilization of three-phase DC voltages through coordination among the three phases. As compared to the centralized control scheme, single point failure risk of the controller is reduced, and the three phases can be independently and individually controlled to improve control flexibility Exemplary embodiments of the invention have been shown and described above. It shall be understood that the invention is not limited to the disclosed embodiments. Instead, the invention intends to cover various modifications and equivalent settings included in the spirit and scope of the appended claims.

What is claimed is:

1. A three-phase system, comprising:
   three-phase circuit, each phase circuit of the three-phase circuit including at least one power conversion cell; and
   at least three phase controllers for controlling each phase circuit, respectively, each of the phase controllers including a communication interface through which the at least three phase controllers are in communications connection with each other;
   wherein the phase controller of each phase circuit is configured for regulating bridge arm voltage of the at least one power conversion cell in the corresponding phase circuit by receiving signals sent from the phase controllers of other two phase circuits through the communication interface,
   wherein the phase controller of each phase circuit receives active power signals sent from the phase controllers of other two phase circuits, and generate zero-sequence component according to the active power signals (XA, XB and XC) reflecting active power of each phase circuit and phase signals (YA, YB and YC) reflecting current phase or voltage phase of each phase circuits, and regulates bridge arm voltage of each power conversion cell in the corresponding phase circuit according to the zero-sequence component correspondingly, wherein the zero-sequence component=(XA×YA+XB×YB+XC×YC)×K0, where K0 is a proportional coefficient.

2. The three-phase system according to claim 1, wherein the three-phase system is a delta-connection three-phase system, and each of the phase controllers comprises:
a DC voltage loop controller for receiving DC voltage reference and DC voltage feedback of the corresponding phase circuit, and outputting active current reference of the corresponding phase circuit;
a three-phase current balancing module for receiving reactive current reference of a power grid and active current references of other two phase circuits sent from the phase controllers of other two phase circuits, and outputting reactive current reference of the corresponding phase circuit;
an AC current reference generation module for generating AC current reference of the corresponding phase circuit according to the active current reference of the corresponding phase circuit, the reactive current reference of the corresponding phase circuit and the voltage phase signal of the corresponding phase circuit; and
a current loop controller for receiving the AC current reference of the corresponding phase circuit and current feedback of the corresponding phase circuit, and outputting modulation voltage reference of the corresponding phase circuit;
wherein modulation voltage reference of the three-phase circuits is modulated to output bridge arm voltage reference of each phase circuit, respectively, and the bridge arm voltage of each phase circuit is regulated according to the bridge arm voltage reference.

3. The three-phase system according to claim 1, wherein the three-phase system is a delta-connection three-phase system, and each of the phase controllers comprises:
a DC voltage loop controller for receiving DC voltage reference and DC voltage feedback of the corresponding phase circuit, and outputting active current reference of the corresponding phase circuit;
a three-phase current balancing module for receiving the active current reference of the corresponding phase circuit and active current references of other two phase circuits sent from the phase controllers of other two phase circuits, and outputting balance current reference of the corresponding phase circuit;
an AC current reference generation module for generating AC current reference of the corresponding phase circuit according to a reactive current reference of a power grid, the balance current reference of the corresponding phase circuit, and the voltage phase signal of the corresponding phase circuit;
a DC voltage balancing module for generating AC current reference of the corresponding phase circuit according to the AC current reference of the corresponding phase circuit and a zero-sequence current; and
a current loop controller for receiving the AC current reference of the corresponding phase circuit and current feedback of the corresponding phase circuit, and outputting modulation voltage reference of the corresponding phase circuit;
wherein modulation voltage reference of the three-phase circuit is modulated to output bridge arm voltage reference of each phase circuit, respectively, and the bridge arm voltage of each phase circuit is regulated according to the bridge arm voltage reference.

4. The three-phase system according to claim 3, wherein each of the phase controllers is configured to
generate active power signal reflecting active power of the corresponding phase circuit according to voltage signal of the corresponding phase circuit, respectively, and receive the active power signals of other two phase circuits, and
generate the zero-sequence current according to the active power signals reflecting each phase circuits and the voltage phase signals of each phase circuits.

5. The three-phase system according to claim 1, wherein the three-phase system is a Y-connection three-phase system, and each of the phase controllers comprises:
a DC voltage loop controller for receiving DC voltage reference and DC voltage feedback of the corresponding phase circuit, and outputting active current reference of the corresponding phase circuit;
a three-phase current balancing module for receiving the active current reference of the corresponding phase circuit and active current references of other two phase circuits sent from the phase controllers of other two phase circuits, and outputting balance current reference of the corresponding phase circuit;
an AC current reference generation module for generating AC current reference of the corresponding phase circuit according to a reactive current reference of a power grid, the balance current reference of the corresponding phase circuit, and the voltage phase signal of the corresponding phase circuit;
a current loop controller for receiving the AC current reference of the corresponding phase circuit and current feedback of the corresponding phase circuit, and outputting output voltage reference of the corresponding phase circuit; and
a DC voltage balancing module for generating modulation voltage reference of the corresponding phase circuit according to the output voltage reference of the corresponding phase circuit and a zero-sequence voltage;
wherein modulation voltage reference of the three-phase circuit is modulated to output bridge arm voltage reference of each phase circuit, respectively, and the bridge arm voltage of each phase circuit is regulated according to the bridge arm voltage reference.

6. The three-phase system according to claim 5, wherein each of the phase controllers is configured to
generate active power signal reflecting active powers of the corresponding phase circuit according to voltage signal of the corresponding phase circuit, respectively, and receive the active power signals of other two phase circuits, and
generate the zero-sequence voltage according to the active power messages reflecting each phase circuits and the current phase messages of each phase circuits.

7. The three-phase system according to any one of claims 1, wherein each phase circuit includes a plurality of power conversion cells connected in series, and the plurality of power conversion cells of each phase circuit and the corresponding phase controller are connected in serial communication to form a loop network.

8. The three-phase system according to claim 1, wherein each phase circuit includes a plurality of power conversion cells, an communication among the plurality of power conversion cells of each phase circuit is loop communication or bus communication or star communication, and communication among phase circuits of the three-phase circuit is loop communication or bus communication or star communication.

9. A three-phase system, comprising:
three-phase circuit, each phase circuit of the three-phase circuit including at least one power conversion cell; and
at least three phase controllers for controlling each phase circuit, respectively,
wherein each of the phase controllers generates active power signal (XA, XB and XC) reflecting active power of the corresponding phase circuit according to voltage signal reflecting the corresponding phase circuit, respectively;
each of the phase controllers also receives active power signals reflecting active powers of other two phase circuits, and generate zero-sequence component according to the active power signals (XA, XB and XC) reflecting active power of each phase circuit and phase signals (YA, YB and YC) reflecting current phase or voltage phase of each phase circuits, wherein,
the zero-sequence component=(XA×YA+XB×YB+XC×YC)×K0, where K0 is a proportional coefficient;
each of the phase controllers further regulates bridge arm voltage of each power conversion cell in the corresponding phase circuit according to the zero-sequence component correspondingly.

10. The three-phase system according to claim 9, wherein the three-phase system is a delta-connection three-phase system, the active power signal of each phase circuit is active current reference of each phase circuit, the phase signal of each phase circuit is voltage phase signal of each phase circuit, each of the phase controllers receives active current references reflecting active powers of other two phase circuits, and generates a zero-sequence current according to the active current references reflecting each phase circuits and the voltage phase signal reflecting voltage phases of each phase circuits.

11. The three-phase system according to claim 10, wherein each of the phase controllers comprises:
a DC voltage loop controller for receiving DC voltage reference and DC voltage feedback of the corresponding phase circuit, and outputting active current reference of the corresponding phase circuit;
a three-phase current balancing module for receiving the active current reference of the corresponding phase circuit and active current references of other two phase circuits sent from the phase controllers of other two phase circuits, and outputting balance current reference of the corresponding phase circuit;
an AC current reference generation module for generating AC current reference of the corresponding phase circuit according to a reactive current reference of a power grid, the balance current reference of the corresponding phase circuit, and the voltage phase signal of the corresponding phase circuit;
a DC voltage balancing module for generating AC current reference of the corresponding phase circuit according to the AC current reference of the corresponding phase circuit and a zero-sequence current; and
a current loop controller for receiving the AC current reference of the corresponding phase circuit and current feedback of the corresponding phase circuit, and outputting modulation voltage reference of the corresponding phase circuit;
wherein modulation voltage reference of the three-phase circuit is modulated to output bridge arm voltage reference of each phase circuit, respectively, and the bridge arm voltage of each phase circuit is regulated according to the bridge arm voltage references.

12. The three-phase system according to claim 9, wherein the three-phase system is a Y-connection three-phase system, the active power signal of each phase circuit is active current references of each phase circuit, the phase signal of each phase circuit is current phase signal of each phase circuit, each of the phase controllers receives active current references reflecting active powers of other two phase circuits, and generates a zero-sequence voltage according to the active current references reflecting each phase circuit and the current phase signals reflecting current phases of each phase circuits.

13. The three-phase system according to claim 12, wherein each of the phase controllers comprises:
a DC voltage loop controller for receiving DC voltage reference and DC voltage feedback of the corresponding phase circuit, and outputting active current reference of the corresponding phase circuit;
a three-phase current balancing module for receiving the active current reference of the corresponding phase circuit and active current references of other two phase circuits sent from the phase controllers of other two phase circuits, and outputting balance current reference of the corresponding phase circuit;
an AC current reference generation module for generating AC current reference of the corresponding phase circuit according to a reactive current reference of a power grid, the balance current reference of the corresponding phase circuit, and the voltage phase signal of the corresponding phase circuit;
a current loop controller for receiving the AC current reference of the corresponding phase circuit and current feedback of the corresponding phase circuit, and outputting output voltage reference of the corresponding phase circuit; and
a DC voltage balancing module for generating modulation voltage reference of the corresponding phase circuit according to the output voltage reference of the corresponding phase circuit and a zero-sequence voltage;
wherein modulation voltage reference of the three-phase circuit is modulated to output bridge arm voltage reference of each phase circuit, respectively, and the bridge arm voltage of each phase circuit is regulated according to the bridge arm voltage reference.

14. A distributed control method of a three-phase system, wherein the three-phase system comprises:
three-phase circuits, each phase circuit of the three-phase circuit including at least one power conversion cell; and
at least three phase controllers for controlling each phase circuit, respectively, each of the phase controllers including a communication interface through which the at least three phase controllers are in communications connection with each other;
wherein the distributed control method comprises:
when loads at DC sides of the three-phase system are unbalanced,
generating, by each of the phase controllers, active power signal (XA, XB, XC) reflecting active power of the corresponding phase circuit according to voltage signal of the corresponding phase circuit, respectively;
receiving, by each of the phase controllers, active power signals reflecting active powers of other two phase circuits, and generating zero-sequence components according to the active power signals (XA, XB and XC) reflecting active powers of each phase circuits and phase signals (YA, YB and YC) reflecting current phases or voltage phases of each phase circuits, wherein, the zero-sequence components=(XA×YA+XB×YB+XC×YC)×K0, where K0 is a proportional coefficient;

regulating, by each of the phase controllers, bridge arm voltages of the respective power conversion cells in the corresponding phase circuit according to the zero-sequence components correspondingly.

15. The distributed control method according to claim 14, wherein the three-phase system is a delta-connection three-phase system, the active power signal of each phase circuit is active current reference of each phase circuit, the phase signal of each phase circuit is voltage phase signal of each phase circuit, each of the phase controllers receives active current references reflecting active powers of other two phase circuits, and generates a zero-sequence current according to the active current references reflecting the active power of each phase circuits and the voltage phase signals reflecting voltage phases of each phase circuits.

16. The distributed control method according to claim 15, wherein each of the phase controllers comprises:
- a DC voltage loop controller for receiving DC voltage reference and DC voltage feedback of the corresponding phase circuit, and outputting active current reference of the corresponding phase circuit;
- a three-phase current balancing module for receiving the active current reference of the corresponding phase circuit and active current references of other two phase circuits sent from the phase controllers of other two phase circuits, and outputting balance current references of the corresponding phase circuit;
- an AC current reference generation module for generating AC current reference of the corresponding phase circuit according to a reactive current reference of a power grid, the balance current reference of the corresponding phase circuit, and the voltage phase signal of the corresponding phase circuit;
- a DC voltage balancing module for generating AC current reference of the corresponding phase circuit according to the AC current reference of the corresponding phase circuit and a zero-sequence current; and
- a current loop controller for receiving the AC current reference of the corresponding phase circuit and current feedback of the corresponding phase circuit, and outputting modulation voltage reference of the corresponding phase circuit;
wherein modulation voltage references of the three-phase circuit are modulated to output bridge arm voltage reference of each phase circuit, respectively, and the bridge arm voltage of each phase circuit is regulated according to the bridge arm voltage reference.

17. The distributed control method according to claim 14, wherein the three-phase system is a Y-connection three-phase system, the active power signal of each phase circuit is active current reference of each phase circuit, the phase signal of each phase circuit is current phase signal of each phase circuit, each of the phase controllers receives active current references reflecting active powers of other two phase circuits, and generates a zero-sequence voltage according to the active current reference reflecting each phase circuit and the current phase signal reflecting current phase of each phase circuit.

18. The distributed control method according to claim 17, wherein each of the phase controllers comprises:
- a DC voltage loop controller for receiving DC voltage reference and DC voltage feedback of the corresponding phase circuit, and outputting active current reference of the corresponding phase circuit;
- a three-phase current balancing module for receiving the active current reference of the corresponding phase circuit and active current references of other two phase circuits sent from the phase controllers of other two phase circuits, and outputting balance current reference of the corresponding phase circuit;
- an AC current reference generation module for generating AC current reference of the corresponding phase circuit according to a reactive current reference of a power grid, the balance current reference of the corresponding phase circuit, and the voltage phase signal of the corresponding phase circuit;
- a current loop controller for receiving the AC current reference of the corresponding phase circuit and current feedback of the corresponding phase circuit, and outputting output voltage reference of the corresponding phase circuit; and
- a DC voltage balancing module for generating modulation voltage reference of the corresponding phase circuit according to the output voltage reference of the corresponding phase circuit and a zero-sequence voltage;
wherein the modulation voltage references of the three-phase circuit are modulated to output bridge arm voltage reference of each phase circuit, respectively, and the bridge arm voltage of each phase circuit is regulated according to the bridge arm voltage reference.

* * * * *